United States Patent
Kim

(10) Patent No.: US 8,317,167 B2
(45) Date of Patent: Nov. 27, 2012

(54) HUMIDIFIER FOR FUEL CELL

(75) Inventor: Hyun Yoo Kim, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 384 days.

(21) Appl. No.: 12/752,794

(22) Filed: Apr. 1, 2010

(65) Prior Publication Data

US 2011/0127683 A1 Jun. 2, 2011

(30) Foreign Application Priority Data

Nov. 30, 2009 (KR) ......................... 10-2009-0116517

(51) Int. Cl.
*B01F 3/04* (2006.01)
(52) U.S. Cl. ....................................... 261/104
(58) Field of Classification Search .................. 261/102, 261/104; 96/8
See application file for complete search history.

(56) References Cited

U.S. PATENT DOCUMENTS

| | | | | |
|---|---|---|---|---|
| 4,911,846 A * | 3/1990 | Akasu et al. | ................... | 210/645 |
| 6,653,012 B2 * | 11/2003 | Suzuki et al. | ................. | 429/413 |
| 7,858,247 B2 * | 12/2010 | Kim | ................................ | 429/413 |
| 2005/0221133 A1 * | 10/2005 | Tanihara et al. | ................. | 429/13 |
| 2007/0246847 A1 * | 10/2007 | Bitoh | ............................ | 261/104 |
| 2008/0093752 A1 * | 4/2008 | Jeon | ............................... | 261/100 |
| 2009/0115078 A1 * | 5/2009 | Leister | ........................... | 261/104 |

FOREIGN PATENT DOCUMENTS

| | | |
|---|---|---|
| JP | 2001-202978 A | 7/2001 |
| JP | 2005-034715 A | 2/2005 |
| JP | 2007-324031 A | 12/2007 |
| JP | 2007-328994 A | 12/2007 |
| KR | 10-2009-0025668 | 3/2009 |

* cited by examiner

*Primary Examiner* — Charles Bushey
(74) *Attorney, Agent, or Firm* — Edwards Wildman Palmer LLP; Peter F. Corless

(57) ABSTRACT

The present invention provides a humidifier for a fuel cell, in which a plurality of hollow fiber membranes having different diameters are appropriately arranged to control the flow direction of dry air introduced into the humidifier, thus uniformly humidifying the dry air.

10 Claims, 4 Drawing Sheets

PRIOR ART

PRESENT INVENTION

HUMIDIFIER FOR FUEL CELL

CROSS-REFERENCE TO RELATED APPLICATION

This application claims under 35 U.S.C. §119(a) the benefit of Korean Patent Application No. 10-2009-0116517 filed Nov. 30, 2009, the entire contents of which are incorporated herein by reference.

BACKGROUND (a) Technical Field

The present disclosure relates, generally, to a humidifier for a fuel cell. More particularly, it relates to a humidifier for a fuel cell, in which a plurality of hollow fiber membranes having different diameters are appropriately arranged to control the flow direction of dry air introduced into the humidifier, thus suitably uniformly humidifying the dry air.

(b) Background Art

An electrolyte membrane in a fuel cell is preferably humidified for the operation of the fuel cell, and, accordingly, a humidifier which performs humidification by water exchange between exhaust gas (humid air) discharged from the fuel cell and dry air supplied form the outside is used.

In particular, a compact humidifier which consumes less power and requires a small installation space is required in a fuel cell. Although there are various types of humidifiers such as an ultrasonic humidifier, a steam humidifier, an evaporative humidifier, etc, a humidifier using hollow fiber membranes is suitably used in the fuel cell.

As shown in FIG. 1, a typical air supply system in a fuel cell system includes a membrane humidifier 100, in which dry air is supplied from the outside by an air blower 202 and, exhaust gas discharged from a fuel cell stack 200 passes through the membrane humidifier 100 such that the dry air is humidified by water contained in the exhaust gas while passing through hollow fiber membranes provided in the membrane humidifier 100.

FIG. 2 is a cross-sectional view showing the configuration of an exemplary hollow fiber membrane humidifier.

As shown in FIG. 2, the humidifier 100 preferably includes a housing 101. The housing 101 preferably includes a first inlet 102 through which dry air is suitably introduced and a first outlet 103 through which humidified air is suitably discharged. In particular, a hollow fiber membrane module 107 is suitably disposed in the inside of the housing 101, and a plurality of hollow fiber membranes 106 are accommodated in the hollow fiber membrane module 107.

In the humidifier 100 using the hollow fiber membranes 106 with the above-described configuration, when exhaust gas (humid air) discharged from the fuel cell stack is supplied to the inside of the housing 101 through a second inlet 104, the water in the exhaust gas is separated by capillary action of the hollow fiber membranes 106, and the separated water is condensed while passing through capillary tubes of the hollow fiber membranes 106 and collected in the hollow fiber membranes 106.

Then, the exhaust gas, from which water is separated, moves to the outside of the hollow fiber membranes 106 and is discharged to the outside through a second outlet 105 of the housing 101.

Further, outside air (dry air) is supplied through the first inlet 102 of the housing 101 by the operation of the air blower and passes through the hollow fiber membranes 106. Accordingly, since the water separated from the humid air is collected in the hollow fiber membranes 106, the dry air is suitably humidified by the water and then supplied to the fuel cell stack through the first outlet 103.

As shown in FIG. 2, since the plurality of hollow fiber membranes 106 are suitably concentrated in the hollow fiber membrane module 107, it is difficult for the humid air introduced through the second inlet 104 to permeate through the hollow fiber membrane module 107. In particular, the rate at which the humid air is diffused into the hollow fiber membrane module 107 is very low, which makes it more difficult for the humid air to permeate through the hollow fiber membrane module 107.

Accordingly, the humid air passing through the outside of the hollow fiber membrane module 107 accommodated in the housing 101 does not penetrate into the center of the hollow fiber membrane module 107 as shown in the dotted line box of FIG. 2 but mainly flows along the periphery of the hollow fiber membrane module 107 as shown by the arrows of FIG. 2. As a result, the rate at which the humid air is diffused into the hollow fiber membrane module 107 is suitably reduced, which decreases the humidification efficiency.

Accordingly, the hollow fiber membranes 106 located in the center of the hollow fiber membrane module 107 cannot be suitably supplied with sufficient water, and thereby the overall efficiency of the membrane humidifier is reduced.

Further, in the conventional membrane humidifier, the dry air introduced through the first inlet 102 mainly flows through the center (as shown in the dotted line box of FIG. 2) of the hollow fiber membrane module 107, and as a result the efficiency of the membrane humidifier is further reduced.

This is illustrated in the simulation test results of FIG. 3.

It can be clearly seen from FIG. 3 that most of the dry air flows only through the center of the hollow fiber membrane module 107.

Accordingly, since the dry air introduced through the first inlet 102 mainly flows through the center of the hollow fiber membrane module 107 (as shown in the dotted line box of FIG. 2) and the humid air introduced through the second inlet 104 flows along the periphery of the hollow fiber membrane module 107, the overall humidification efficiency of the humidifier may be suitably reduced.

Such a problem becomes more serious when the amount of dry air is large, i.e., when the fuel cell stack provides high power output.

Another problem of the conventional humidifier is caused by the hollow fiber membranes and the arrangement thereof.

Despite the advantage that the membrane humidifier is applicable for use with a vehicle, available hollow fiber membrane materials are very expensive, and thus it is the manufacturing cost is high.

In most cases, sufficient humidification is required in a low current region of the fuel cell system, and much water is produced in high power and high current regions to the extent that a cathode does not require humidification. Nevertheless, most of the conventional humidifiers are operated without varying the amount of humidification in both the low and high current regions. In particular, in the case where the hollow fiber membranes are made of only Nafion, a high humidity of more than 80% RH is provided even in the high current region.

Further, a bundle of hollow fiber membranes having the same diameter is disposed in the conventional membrane humidifier, and the hollow fiber membranes are made of expensive Nafion, which is disadvantageous in terms of manufacturing cost.

Since a large amount of water is produced and a high humidity is provided in the high current region of the fuel cell system, an increase in resistance of cathode material transfer and a flooding phenomenon may occur, which results in air starvation of the cathode. As a result, the deterioration of the fuel cell catalyst is accelerated and thus the durability of the fuel cell is suitably reduced.

Accordingly, there is a need in the art for humidifiers for a fuel cell.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a humidifier for a fuel cell, in which a plurality of hollow fiber membranes having a small diameter are suitably disposed in the center of a hollow fiber membrane module and a plurality of hollow fiber membranes having a large diameter are suitably disposed around the periphery of the hollow fiber membrane module so as to ensure uniform humidification for dry air and prevent the occurrence of flooding and an increase in load of an air blower.

In one preferred embodiment, the present invention provides a humidifier for a fuel cell, the humidifier preferably including a hollow fiber membrane module and a plurality of hollow fiber membranes suitably arranged in the hollow fiber membrane module, wherein the hollow fiber membranes may have different diameters and may be appropriately arranged in the hollow fiber membrane module.

In another preferred embodiment, a plurality of hollow fiber membranes having a small diameter may be suitably arranged in the center of the hollow fiber membrane module, through which dry air supplied from the outside by an air blower mainly flows, and a plurality of hollow fiber membranes having a large diameter may be suitably arranged in the periphery of the hollow fiber membrane module, through which humid air discharged from a fuel cell stack mainly flows.

In another preferred embodiment, a plurality of first hollow fiber membranes having the smallest diameter may be suitably arranged in the center of the hollow fiber membrane module, a plurality of third hollow fiber membranes having the largest diameter may be suitably arranged in the periphery of the hollow fiber membrane module, and a plurality of second hollow fiber membranes having an intermediate diameter may be suitably arranged between the first and third hollow fiber membranes.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
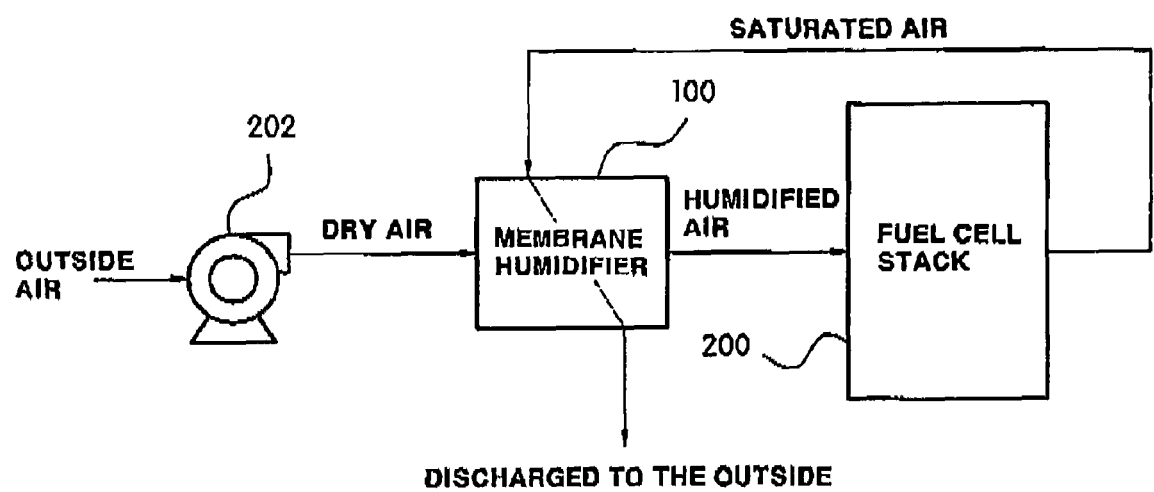
FIG. 1 is a schematic diagram showing a typical air supply system in a fuel cell system.
Figure 2:
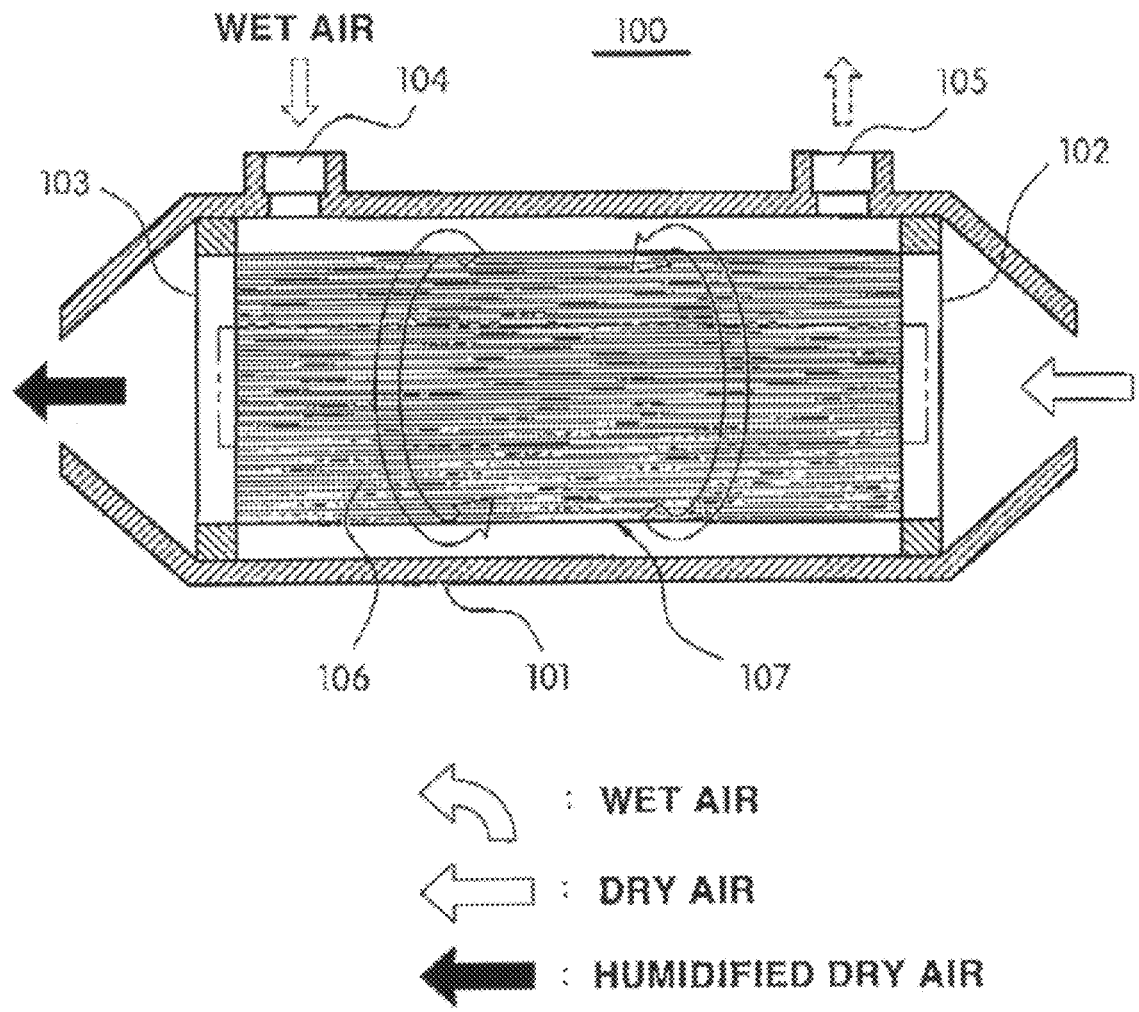
FIG. 2 is a schematic diagram showing the configuration and operation of a typical humidifier for a fuel cell.
Figure 3:
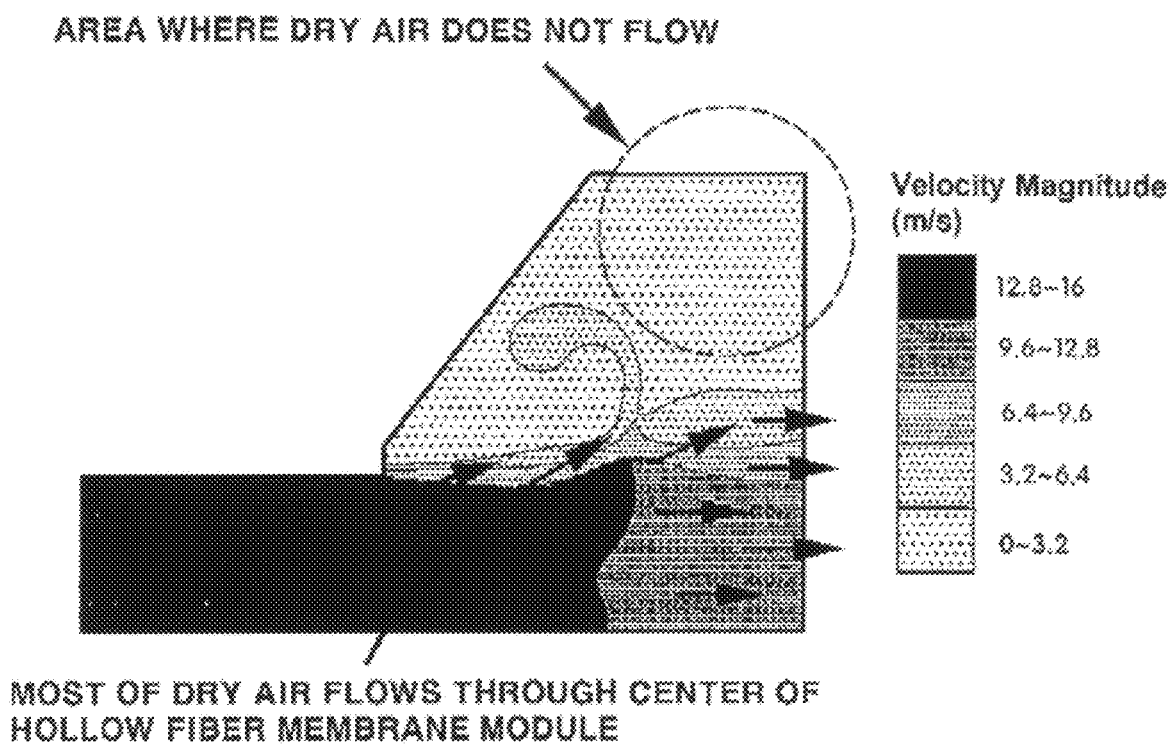
FIG. 3 shows simulation test results illustrating a problem of a conventional humidifier for a fuel cell.

Reference numerals set forth in the Drawings includes reference to the following elements as further discussed below:

| | |
|---|---|
| 10: | hollow fiber membrane module |
| 11: | first hollow fiber membrane |
| 12: | second hollow fiber membrane |
| 13: | third hollow fiber membrane |
| 100: | humidifier |
| 101: | housing |
| 102: | first inlet |
| 103: | first outlet |
| 104: | second inlet |
| 105: | second outlet |
| 106: | hollow fiber membrane |
| 107: | hollow fiber membrane module |
| 200: | fuel cell stack |
| 202: | air blower |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

As described herein, the present invention includes a humidifier for a fuel cell, the humidifier comprising a hollow fiber membrane module and a plurality of hollow fiber membranes arranged in the hollow fiber membrane module.

In one embodiment, the hollow fiber membranes have different diameters and are arranged in the hollow fiber membrane module.

In another embodiment, the hollow fiber membranes have different diameters and are arranged in the hollow fiber membrane module.

In another related embodiment, a plurality of hollow fiber membranes having a small diameter are arranged in the center of the hollow fiber membrane module, through which dry air supplied form the outside by an air blower mainly flows.

In another related embodiment, a plurality of hollow fiber membranes having a large diameter are arranged in the periphery of the hollow fiber membrane module, through which humid air discharged from a fuel cell stack mainly flows.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
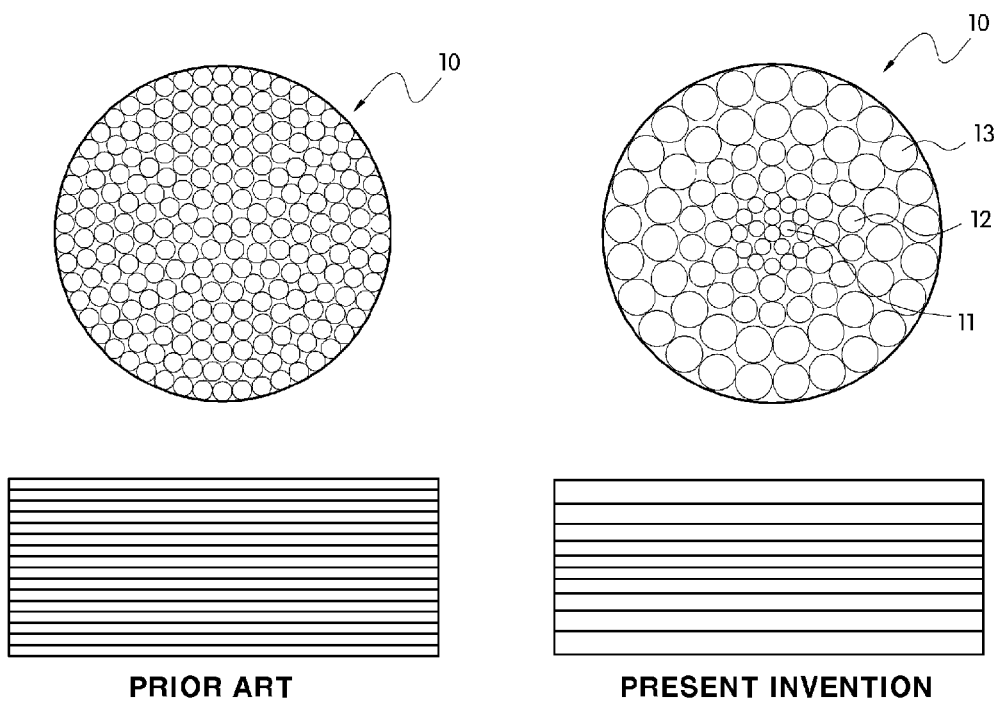
FIG. 4 is a schematic diagram comparing the arrangement of hollow fiber membranes of a humidifier in accordance with an exemplary embodiment of the present invention and that of a conventional humidifier.

FIG. 4 is a schematic diagram comparing the arrangement of hollow fiber membranes of a humidifier in accordance with an exemplary embodiment of the present invention and that of a conventional humidifier.

As described herein, the fuel cell humidifier has a structure in which a hollow fiber membrane module is suitably disposed in the inside of a housing, and a plurality of hollow fiber membranes are accommodated in the hollow fiber membrane module in the form of a bundle. It is known that dry air supplied from the outside by an air blower mainly flows through the center of the hollow fiber membrane module and humid air discharged from a fuel cell stack flows along the periphery of the hollow fiber membrane module.

Accordingly, the present invention provides a humidifier for a fuel cell, in which a plurality of hollow fiber membranes having different diameters are appropriately arranged to suitably improve the humidification performance for dry air introduced into the humidifier and solve the problems associated with the conventional humidifiers.

Preferably, a plurality of hollow fiber membranes having different diameters are appropriately arranged in the humidifier of the present invention, in which hollow fiber membranes having a larger diameter are suitably arranged from the center to the periphery.

Preferably, hollow fiber membranes having a smaller diameter are suitably arranged from the periphery to the center of the humidifier.

Referring to FIG. 4, a bundle of hollow fiber membranes having the same diameter is suitably arranged in a hollow fiber membrane module 10 of the conventional membrane humidifier to humidify air by water exchange in the hollow fiber membrane module 10.

Accordingly, as described herein, the dry air introduced into the conventional humidifier flows into the hollow fiber membranes arranged in the center of the hollow fiber membrane module, and the humid air is suitably supplied to the outside of the hollow fiber membranes arranged along the periphery of the hollow fiber membrane module. Accordingly, the humidification efficiency of the humidifier, in which the humid air humidifies the dry air, is suitably reduced.

According to certain preferred embodiments of the present invention, a plurality of hollow fiber membranes having different diameters are appropriately arranged in such a manner that hollow fiber membranes having a larger diameter are suitably arranged from the center of the hollow fiber membrane module to the periphery thereof.

For example, as shown in FIG. 4, a plurality of first hollow fiber membranes 11 having the smallest diameter are suitably arranged in the center of the hollow fiber membrane module 10, a plurality of third hollow fiber membranes 13 having the largest diameter are suitably arranged in the periphery of the hollow fiber membrane module 10, and a plurality of second hollow fiber membranes 12 having an intermediate diameter are suitably arranged between the first and third hollow fiber membranes 11 and 13.

Accordingly, although the dry air introduced into the humidifier by the air blower mainly flows through the first hollow fiber membranes 11 arranged in the center of the hollow fiber membrane module 10, the amount of dry air flowing into the first hollow fiber membranes 11 is suitably reduced since the diameter of the first hollow fiber membranes 11 is small. Preferably, the dry air which does not flow into the first hollow fiber membranes 11 is suitably diffused to the periphery of the first hollow fiber membranes 11 by the flow pressure and thus flows into the second and third hollow fiber membranes 12 and 13 having larger diameters.

Accordingly, while the dry air flows through the first hollow fiber membranes 11 arranged in the center of the hollow fiber membrane module 10, it does not intensively flow into the first hollow fiber membranes 11 but is smoothly diffused into the second and third hollow fiber membranes 12 and 13. As a result, the dry air can be uniformly distributed over the entire hollow fiber membrane module 10.

Therefore, according to further preferred embodiments of the present invention, a large amount of exhaust gas (humid air) introduced from the fuel cell stack to the inside of the hollow fiber membrane module 10 of the humidifier flows along the periphery of the hollow fiber membrane module 10. Preferably, the humid air supplied from the outermost of the hollow fiber membrane module 10 is smoothly diffused into the third and second hollow fiber membranes 13 and 12 and, at the same time, provides sufficient water to the dry air flowing into the third and second hollow fiber membranes 13 and 12 as well as the first hollow fiber membranes 11, thus suitably improving the humidification efficiency for the dry air supplied to the fuel cell stack.

Preferably, since the third hollow fiber membranes 13 arranged along the periphery of the hollow fiber membrane module 10 have the largest diameter, a gap between the third hollow fiber membranes 13 is suitably increased such that the humid air smoothly flows into the gaps and is easily diffused into the hollow fiber membranes. As a result, the humidification efficiency for the dry air flowing into the third and second hollow fiber membranes 13 and 12 as well as the first hollow fiber membranes 11 is suitably improved.

In other exemplary embodiments, for example in the case of the hollow fiber membranes adopted in the membrane humidifier, the amount of humid air diffused into the hollow fiber membranes having a larger diameter should be suitably increased, and thus the humidification performance may be somewhat reduced. However, since the humid air introduced from the fuel cell stack to the humidifier mainly flows along the periphery of the hollow fiber membrane module 10 and is first in contact with the third hollow fiber membranes 13 arranged along the periphery of the hollow fiber membrane module 10 to provide sufficient water, it is possible to suitably prevent the humidification performance from being reduced due to a reduction in the amount of humidification, even when the third hollow fiber membranes 13 having the largest diameter are arranged along the periphery of the hollow fiber membrane module 10. Accordingly, in further preferred embodiments of the present invention as described herein, it is possible to provide uniform humidification to the dry air in the entire hollow fiber membranes.

Further, as described herein, in the case of a high power region where a large amount of water is suitably produced in the fuel cell stack due to the same humidification conditions, catalyst deterioration occurs due to a flooding phenomenon occurring in the fuel cell stack, and thereby the durability of the fuel cell stack is suitably reduced. However, according to the arrangement of the hollow fiber membranes of the present invention, the dry air flowing into the third and second hollow fiber membranes 13 and 12 as well as the first hollow fiber membranes 11 is uniformly humidified, and thus the air humidified enough to produce water is not suitably supplied to the fuel cell stack. Accordingly, it is possible to prevent the occurrence of flooding phenomenon in a high power region where a large amount of water is produced in the fuel cell stack itself.

As described herein, the present invention provides, but is not limited only to, the following effects.

In the arrangement of the hollow fiber membrane module for the fuel cell humidifier, the first hollow fiber membranes, which have a higher humidification performance and expand by absorbing water, are suitably arranged in the center of the hollow fiber membrane module and the second hollow fiber membranes, which have a lower humidification performance and do not expand by water, are suitably arranged in the periphery of the hollow fiber membrane module so as to provide the same humidification performance as the conventional membrane humidifier and prevent the increase in the pressure drop in the membrane humidifier and the increase in the load of the air blower.

Further, it is possible to suitably prevent the occurrence of flooding phenomenon in a high power region where a large amount of water is produced in the fuel cell stack itself.

Furthermore, in the arrangement of the hollow fiber membrane module, since the first hollow fiber membranes are suitably formed of expensive Nafion and the second hollow fiber membranes are suitably formed of cheap polyetherimide or polyphenylsulfone, it is possible to manufacture a membrane humidifier which is advantageous in terms of manufacturing cost.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A humidifier for a fuel cell, the humidifier comprising a hollow fiber membrane module and a plurality of hollow fiber membranes arranged in the hollow fiber membrane module,
   wherein the hollow fiber membranes have different diameters and are appropriately arranged in the hollow fiber membrane module,
   wherein a plurality of hollow fiber membranes having a small diameter are arranged in the center of the hollow fiber membrane module, through which dry air supplied from the outside by an air blower mainly flows, and a plurality of hollow fiber membranes having a large diameter are arranged in the periphery of the hollow fiber membrane module, through which humid air discharged from a fuel cell stack mainly flows.

2. The humidifier of claim 1, wherein a plurality of first hollow fiber membranes having the smallest diameter are arranged in the center of the hollow fiber membrane module, a plurality of third hollow fiber membranes having the largest diameter are arranged in the periphery of the hollow fiber membrane module, and a plurality of second hollow fiber membranes having an intermediate diameter are arranged between the first and third hollow fiber membranes.

3. The humidifier of claim 1, wherein a plurality of hollow fiber membranes having a lower humidification performance are arranged in the periphery of the hollow fiber membrane module.

4. The humidifier of claim 1, wherein the hollow fiber membranes having a lower humidification performance are formed of polyetherimide or polyphenylsulfone.

5. A humidifier for a fuel cell, the humidifier comprising a hollow fiber membrane module and a plurality of hollow fiber membranes,
   wherein the hollow fiber membranes have different diameters and are arranged in the hollow fiber membrane module, and
   a plurality of hollow fiber membranes having a small diameter are arranged in the center of the hollow fiber membrane module, through which dry air supplied from the outside by an air blower flows.

6. The humidifier of claim 5, wherein a plurality of hollow fiber membranes having a large diameter are arranged in the periphery of the hollow fiber membrane module, through which humid air discharged from a fuel cell stack flows.

7. A humidifier for a fuel cell, the humidifier comprising a hollow fiber membrane module and a plurality of hollow fiber membranes arranged in the hollow fiber membrane module,
   wherein the hollow fiber membranes have different diameters and are appropriately arranged in the hollow fiber membrane module,
   wherein a plurality of first hollow fiber membranes having the smallest diameter are arranged in the center of the hollow fiber membrane module, a plurality of third hollow fiber membranes having the largest diameter are arranged in the periphery of the hollow fiber membrane module, and a plurality of second hollow fiber membranes having an intermediate diameter are arranged between the first and third hollow fiber membranes.

8. The humidifier of claim 7, wherein a plurality of hollow fiber membranes having a lower humidification performance are arranged in the periphery of the hollow fiber membrane module.

9. The humidifier of claim 7, wherein the hollow fiber membranes having a lower humidification performance are formed of polyetherimide or polyphenylsulfone.

10. A humidifier for a fuel cell, the humidifier comprising a hollow fiber membrane module and a plurality of hollow fiber membranes,
    wherein the hollow fiber membranes have different diameters and are arranged in the hollow fiber membrane module, and
    a plurality of hollow fiber membranes having a large diameter are arranged in the periphery of the hollow fiber membrane module, through which humid air discharged from a fuel cell stack flows.

* * * * *